United States Patent [19]

Hamazaki

[11] Patent Number: 4,668,385
[45] Date of Patent: May 26, 1987

[54] FILTER PRESS
[75] Inventor: Haruo Hamazaki, Yao, Japan
[73] Assignee: Kurita Machinery Manufacturing Company Limited, Osaka, Japan
[21] Appl. No.: 770,187
[22] Filed: Aug. 28, 1985
[30] Foreign Application Priority Data Sep. 1, 1984 [JP] Japan .............................. 59-133442[U]

[51] Int. Cl.$^4$ ........................ B01D 35/14; B01D 25/12
[52] U.S. Cl. ........................................ 210/91; 100/99;
100/194; 210/225; 210/227; 210/230
[58] Field of Search ............................. 100/99, 93, 194;
210/91, 224–231

[56] References Cited
U.S. PATENT DOCUMENTS 3,578,170 5/1971 Kurita .................................. 210/230

FOREIGN PATENT DOCUMENTS 57-35375 8/1982 Japan .

Primary Examiner—Richard V. Fisher
Assistant Examiner—W. Gary Jones
Attorney, Agent, or Firm—Wenderoth, Lind & Ponack

[57] ABSTRACT

A filter press equipped with a filter cloth hanging rod detecting arrangement which includes a support beam which is so arranged between the front and rear stands and above the hanging rods as to suspend the shatter members by means of corresponding brackets. The brackets respectively have longitudinal apertures extending vertically or shafts extending horizontally. Meanwhile the shatter members respectively have shafts inserted in the longitudinal apertures of the brackets or apertures in which the shafts of the brackets are inserted. Accordingly the shatter members may move upwardly and downwardly according the vertical movement of the hanging rods and also swing in an imaginary vertical plane parallel to the support beam following to the horizontal movement of the hanging rods.

2 Claims, 5 Drawing Figures

FILTER PRESS

BACKGROUND OF THE INVENTION

1. Field of the Invention

The present invention generally relates to a filter press arranged to separate a raw liquid to be processed into a filtrate of filtered liquid and residue through filtering or press filtering thereto. More particularly, a filter press is equipped with an improved detecting arrangement for detecting the position of filter cloths or filter cloth hanging rods in normal or abnormal condition of the filter cloths when operated to move downwardly and upwardly.

2. Description of the Prior Art

Conventionally, in a filter press filter cloth of the travelling type, a detecting arrangement as described above has been used to detect the abnormal condition of the filter cloths or filter cloths hanging rods. For instance, in Japanese Utility Model publication (second publication) No. 35,375/1982, there is shown a filter press of this type which comprises front and rear stands. A plurality of filter plates are arranged between the front and rear stands to be opened and closed or pressed. Filter cloths are arranged between each pair of adjacent filter plates suspended by means of corresponding hanging rods fixed to the upper edges of the filter cloths and moved upwardly and downwardly. A plurality of shutter members respectively are arranged above the corresponding hanging rods in an opened state and having detecting openings passing therethrough in the front and rear direction. A light emitting device is arranged on one of the front and rear stands. Another light receiving device is arranged on the other of the front and rear stands.

With the conventional filter press, when all of the hanging rods take the predetermined upper position the shutter members are raised to the high position with the detecting openings thereof defining a light path. Meanwhile, when some hanging rods fail to reach the predetermined upper position due to an accident, the corresponding shutter members stay in a position lower than the high position. Thus, the light emitted from the light emitting device is interrupted by said shutter members resulting in the light receiving device generating a signal representing an occurrence of an abnormal condition.

Meanwhile, in the conventional filter press shutter member is associated with a shutter plate which is accommodated in a corresponding guide box supported by a corresponding filter plate. The corresponding shutter member is slidably supported to move upwardly and downwardly and has apertures corresponding to apertures of the shutter plate to permit the light emitted from the light emitting device to pass therethrough.

The conventional construction as described above has the following disadvantages. First of all, since the guide boxes and the shutter plates are mounted on the corresponding filter plates which are operated to be opened and closed, (for instance even if some filter plates are slightly inclined) the light emitted from the light emitting device may be interrupted by the corresponding guide box and the shutter plate. Thus, the detection of the condition of the filter rods lacks sufficient reliability. Meanwhile, in the conventional construction, even when some filter plates fail to take a predetermined opened position due to an accident, the corresponding filter cloth, and hence the corresponding hanging rod following said filter plate may raise the corresponding shutter member to the high position. Accordingly, the light path can be held in a normal condition, that is to say, the emitted light can reach the light receiving device so that the abnormal condition of the filter plates can not be detected.

Furthermore, the prior art is over complicated in construction because each shutter plate is supported by each corresponding guide box which is mounted on each filter plate by means of support members.

SUMMARY OF THE INVENTION

Accordingly, an essential object of the present invention is to provide an improved filter press equipped with a filter cloth hanging rod detecting arrangement that is simple in construction.

Another important object of the present invention is to provide a filter press of the above described type in which the cloth hanging rod detecting arrangement can detect not only the abnormal condition of the filter cloths but also the abnormal condition of the filter plate.

In accomplishing these and other objects, according to the present invention, there is provided a filter press equipped with a filter cloth hanging rod detecting arrangement comprises a support beam which arranged between the front and rear stands and above the corresponding hanging rods to suspend the corresponding shutter members by means of corresponding brackets. The brackets, respectively, have longitudinal apertures extending vertically or shafts extending horizontally. Meanwhile the shutter members, respectively have shafts inserted in the longitudinal apertures of the brackets or apertures in which the shafts of the brackets are inserted. Therefore, the shutter members move upwardly and downwardly following the vertical movement of the hanging rods and also swing in an imaginary vertical plane parallel to the support beam following the horizontal movement of the hanging rods.

With the above construction, according to the present invention, when all of the hanging rods take the predetermined upper position in the filter plate opening state, the corresponding shutter members are uniformly raised to the high position so that the detecting apertures of the shatter members define a light path which permits the light emitted from the light emitting device to the light receiving device. Meanwhile, when some hanging rods fail to reaching the high position due to an accident the corresponding shutter members are not raised to the high position and the shutter members interrupt the emitted light so that the light receiving device generates a signal representing that some filter cloths are in an abnormal position. The above construction is very simple. Since the shutter members can swing, the hanging rods can easily move horizontally when the filter plates are opened and closed. Furthermore, even if some filter plates do not be open due to an accident, since the shutter members are respectively suspended at predetermined fixed position by a support beam while the corresponding filter cloths and hence the corresponding hanging rods take the position between the pair of adjacent shatter members it is apparent that the corresponding shatter members are not raised to the high position. Accordingly, such trouble as described above can be detected.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENT

Figure 1:
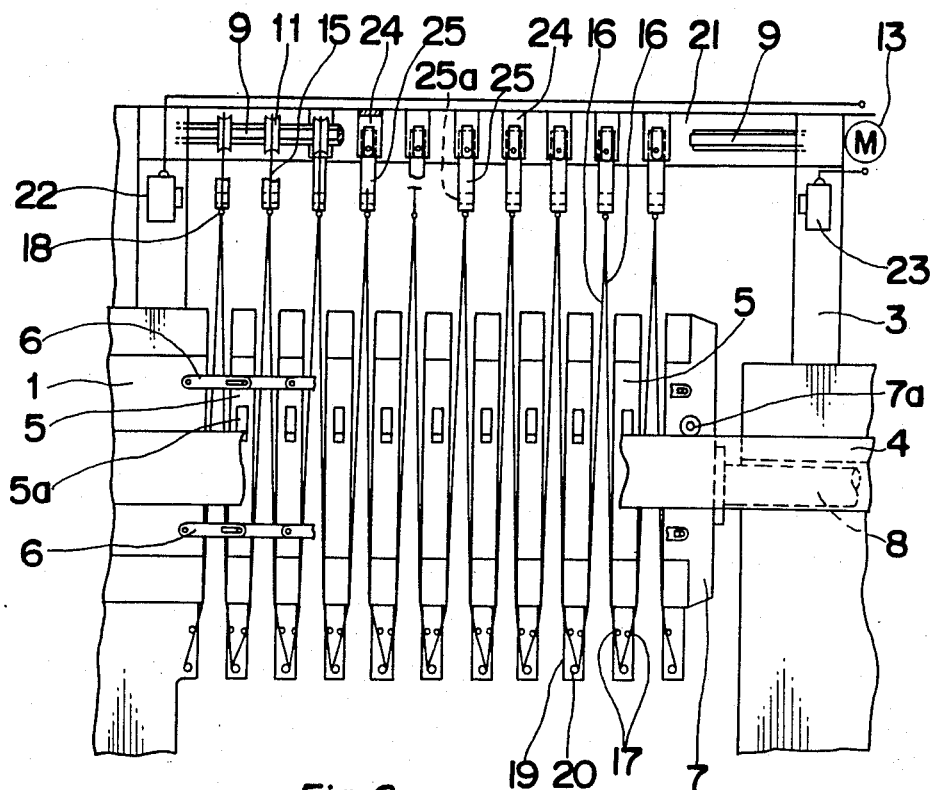
FIG. 1 is a schematic front elevational view of a filter press according to one preferred embodiment of the present invention, particularly showing the filter plates in an opened or spaced state.

Before the description of the present invention proceeds, it is to be noted that like parts are designated by like reference numerals throughout the accompanying drawings.

Figure 2:
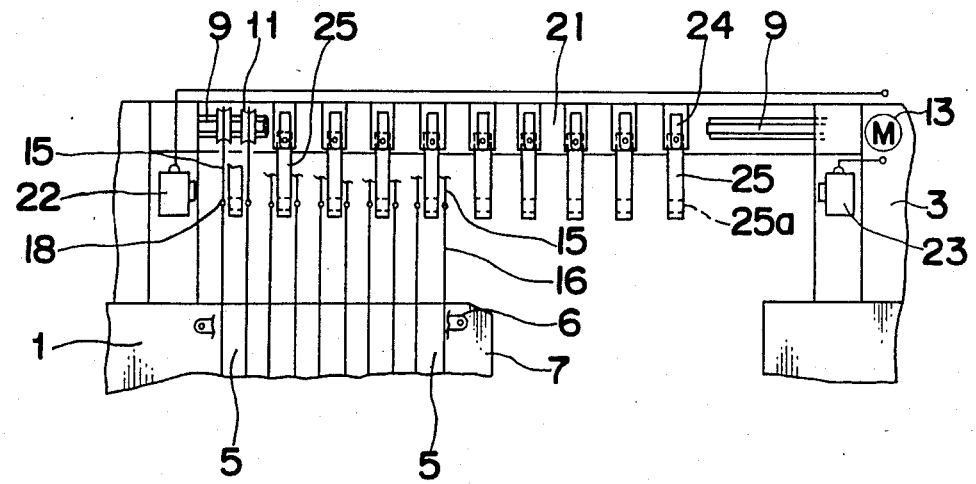
FIG. 2 is a fragmentary front elevational view of the filter press, showing the filter plates in a closed state.
Figure 3:
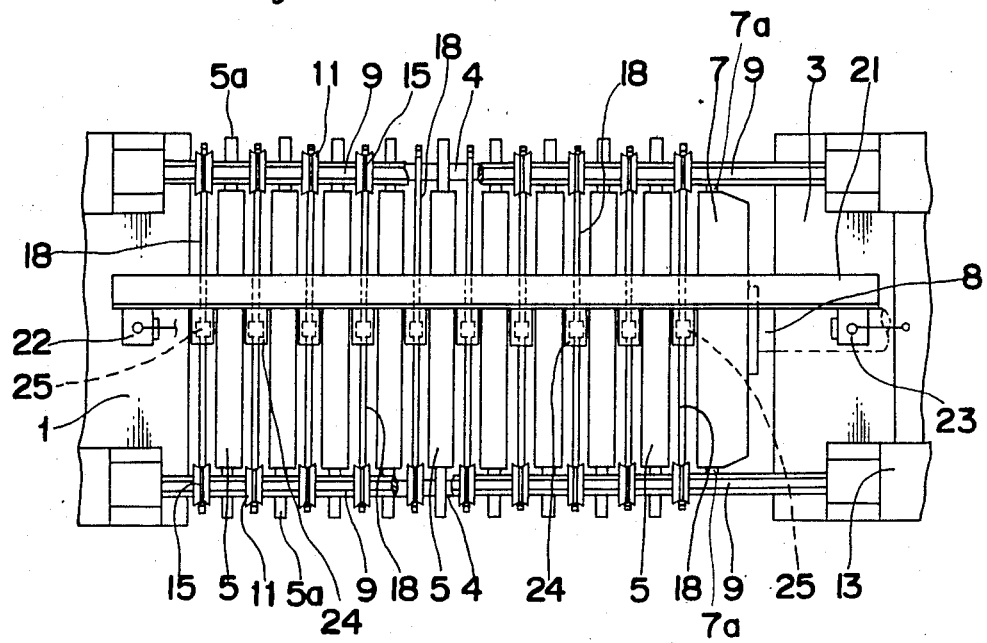
FIG. 3 is a top plan view of the filter press of FIG. 1.

Referring now to the drawings, there is shown in FIGS. 1, 2 and 3, a filter press according to one preferred embodiment of the present invention. The filter press generally includes a front stand 1 and a rear stand 3, which are mounted on a suitable base (not shown) in a spaced relation from each other. Side beams 4 are provided respectively at opposite sides of the front and rear stands 1 and 3. A plurality of filter plates 5 are connected to each other by connecting links 6 provided at opposite sides thereof and slidably supported on upper edges of the side beams 4 through a pair of protrusions 5a formed on opposite sides of each of the filter plates 5 for movement in a lateral direction of FIG. 1. A movable plate 7 is movably supported on upper edges of the side beams 4 through a pair of rollers 7a formed on opposite sides thereof and arranged to be driven by a driving piston 8 of a hydraulic means or the like (not shown) supported by the rear stand 3 for reciprocation in the lateral direction. Upon retraction of the movable plate 7 back to a position shown in FIGS. 1 and 3, the respective filter plates 5 are opened or spaced from each other at predetermined intervals set by the connection links 6.

The filter press further includes a pair of driving shafts 9 each having a polygonal cross section and suitably journaled in upper opposite sides of the front and rear stands 1 and 3 so as to be driven in a forward and a reverse direction of rotation by a motor 13 having a reduction unit mounted on the upper portion of the rear stand 3. The driving shafts 9 are respectively slidably fitted in corresponding pairs of winding up or take-up pulleys 11 rotatably supported at upper opposite sides of the filter plates 5 through support members (not shown) secured to the upper portions of the filter plates 5. A hanger cord 15 is directed around each of the winding up pulleys 11. One end of each hanger cord 15 is connected to the pulley 11, while the other end of the cord 15 is connected to a respective end portion of a hanging rod 18 for suspending a pair of filter cloths 16 therefrom.

On the under surface of the filter plate 5, a pair of support metal pieces or frames 19 is provided to extend downwardly therefrom so as to rotatably hold a pair of guide rollers 17 and a filter cloth take-up roller 20 therebetween. The filter cloth take-up roller 20 is positioned below the pair of guide rollers 17.

As shown in FIG. 1, lower edge portions of the pair of filter cloths 16, which respectively cover the front and rear filter faces at opposite faces of the filter plate 5, are adapted to be separated from each other by the corresponding guide rollers 17 and to be fixedly engaged with the take-up roller 20.

Figure 4:
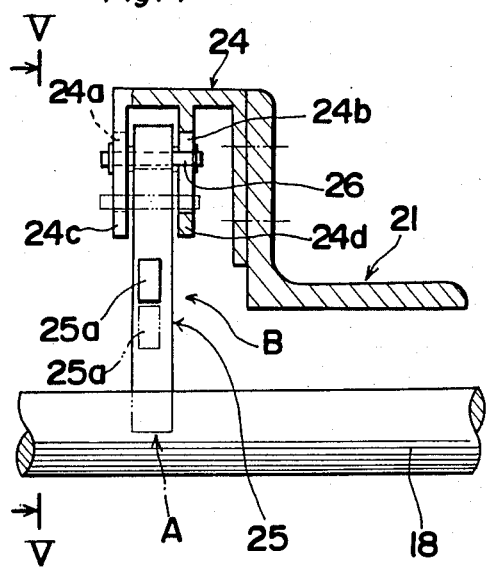
FIG. 4 is a cross section of an essential portion of the filter press of FIGS. 1 to 3.

The filter press further includes a support beam 21 both end portions of which are fixed on the approximately intermediate portion, in the traverse direction, of the upper faces of the front and rear stands 1 and 3. The support beam 21 has an L-shaped section as shown in FIG. 4 and suspends a plurality of shutter members 25 by means of corresponding brackets 24 each having an E-shaped section. As shown in FIGS. 1 to 3, the shutter members 25 are arranged above the corresponding hanging members 18, which take the position above and between the pairs of adjacent filter plates 5 in the opened state, so as to be horizontally aligned.

Each of the shutter members 25 is of a rectangular paralellpiped section and has, at the upper portion thereof, a shaft 26 horizontally extending therethrough and, at the lower portion thereof, an opening 25a extending along the support beam 21. Meanwhile, each bracket 24 has a pair of walls 24c and 24d facing each other in spaced relationship to form a channel for receiving the upper portion of the shutter member 25. The walls 24c and 24d respectively have longitudinal bearing apertures 24a and 24b vertically extending in which the end portions of the shaft 26 are inserted, so that the shutter member 25 can be moved upwardly and downwardly along the longitudinal aperture 25a and 25b and also can be swung around the shaft 26 in an imaginary vertical plane parallel to the support beam 21.

The filter press further has a light emitting device 22 mounted on the upper portion of the front stand 1, and a photoelectric device mounted on the corresponding upper portion of the rear stand 3 so as to receive the light emitted from the light emitting device 22 and passed through a light path defined by the apertures 25a of the series of shutter members 25.

The operation of the filter press having the above construction is as follows.

As shown in FIG. 2, when the filter plates 5 are closed or pressed, the respective hanging rods 18 are disengaged from the corresponding shutter members 25, so that the respective shutter members 25 take the lower position A as shown by the chain line in FIG. 4. Namely, the shafts 26 are respectively supported by the bottom portions of the longitudinal apertures 24a and 24b of the corresponding brackets 24. In this condition, the light emitted from the light emitting device 22 is interrupted by the upper portion above the corresponding apertures 25a of the shutter members 25.

Meanwhile, when the filter plates 5 are separated or opened after a filtering operation, the winding up pulleys 11 simultaneously move together with the respective filter plates 5, so that the hanging rods 18 suspended by the respective pulleys 11 move together with the corresponding pulleys 11 to the right in FIGS. 1 to 3. It is to be here noted the movement of the hanging rods 18 is not interrupted by the shutter members 25 taking the lower position A because that, when the hanging rods 18 push the lower portions of the shatter members 25, the shutter members easily swing to permit the hanging rods 18 to pass therethrough. After the filter plates have completely opened, the filter cloths 16 are moved downwardly to be wound by the take-up roller 20 in order to remove the residue adhering to the filter cloths 16 by residue separating members (not shown) and to wash the filter cloths 16 by washing devices (not shown) arranged below the filter plates 5.

Subsequently, when the hanger cords 15 are wound around the pulleys 11 by the rotation of the driving shafts 9 to raise the hanging rods 18 together with the filter cloths 16, the hanging rods 18 normally push up the corresponding shatter members 25 suspended from the brackets 24 toward the high position B which is indicated by the solid line in FIG. 4. When all of the shutter members 25 are held at the high position B, the light emitted from the light emitting device 22 can reach the photoelectrical device 23 through the apertures 25a of the shutter members 25, so that the photoelectrical device 23 generates a signal to a control unit (not shown) representing the normal condition wherein all of the hanging rods 18, and hence the all of the filter cloths 16, are in the predetermined upper position. Meanwhile, when some trouble occurs during the operation of pulling up the filter cloths 16, for example when some of the filter cloths or hanging rods 18 are accidentally engaged with the filter plates 5, the hanging rods 18 can not reach the predetermined upper position or become inclined. Therefore, the shutter members 25 associated with the hanging rods 18 in trouble can not be pushed up toward the high position B. The result is that the light emitted from the light emitting device 22 is interrupted by the shutter members 25 which are not pushed up to the high position B. Thus, when the driving shafts 9 are rotated to the predetermined limit of the rotated position, the control unit fails to receive the signal representing normal condition so that it recognizes that some trouble has occurred. Moreover, when some hanging rods 18 fail to push up the corresponding shutter members 25 because corresponding filter plates 5 fail to take the predetermined opened position, due to, for example, trouble with the connecting links 6. The abnormal condition can be detected by the hanging rod detecting arrangement.

Figure 5:
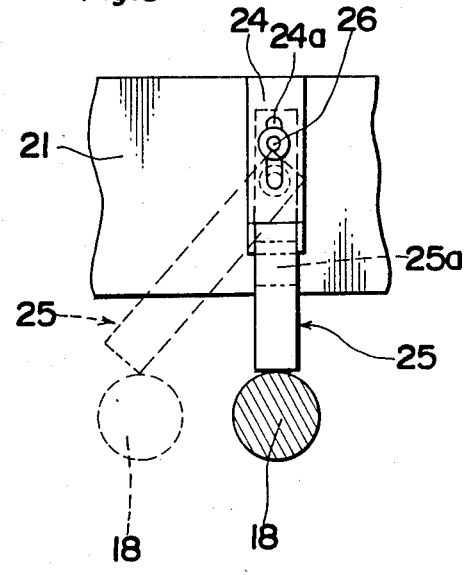
FIG. 5 is a cross section taken along the line V—V in FIG. 4.

With the embodiment as described above, the construction for detecting the positions of the hanging rods 18, and hence the filter cloths, is simple and needs no electrical wiring for each filter plate. Accordingly, the hanging rod detecting means as described above is very reliable in the operation. Furthermore, as shown in FIG. 5, when hanging rods 18 move to the left in FIGS. 1 and 3 together with the winding-up pulleys 11, filter cloths 16 and filter plates 5 during filter plate closing operation, the shatter members 25 being pushed up to the high position B by the hanging rods 18 can easily swing to permit the hanging rods 18 to pass therethrough.

Although the present invention has been fully described by way of example with reference to the accompanying drawings, it is to be noted here that various changes and modifications will be apparent to those skilled in the art. For instance, the light emitting device 22 and photoelectric device 23 can be respectively replaced by a supersonic wave emitting device and supersonic wave receiving device. In this case, by utilizing supersonic waves reflected on the shutter members 25 which are not pushed up to the high position B, the detection of the shutter member that is in trouble is possible. Furthermore, the light emitting device can also replaced by an infrared ray emitting device. Still further, the aperture 25a can be replaced by such an opening communicating with the peripheral surface of the shutter member 25. The shatter member 25 may respectively have a shock absorbing material attached to the bottom face thereof in order to absorb the shock occurring when the hanging rods 18 strike the corresponding shutter members 25 from below. Although, according to the above embodiment, the filter press has a single support beam 21 for suspending the shatter plates 25, the filter press preferably has a pair of support beams arranged at the both side of the hanging rods 18, so that, when the hanging rods 18 are inclined at the upper position due to some reason, the inclination of the hanging rods can be also detected. Still further, the brackets may respectively have shafts 26, while the shatter members respectively have longitudinal apertures extending vertically to receive said shafts. Therefore, unless such changes and modifications otherwise depart from the scope of the present invention, they should be construed as included therein.

What is claimed is:

1. A filter press comprising:

front and rear stands;

a plurality of adjacent filter plates arranged between said front and rear stands;

means for moving said filter plates between opened and closed positions;

filter cloths arranged between each pair of said adjacent filter plates, and hanging rod means attached to an upper edge of each of said filter cloths;

means for moving said hanging rods means and associated filter cloths upwardly and downwardly between predetermined upper and lower positions;

a plurality of shutter members each arranged at a fixed location relative to a normal open position of said filter plates above said hanging rod means and attached filter cloth, each of said shutter members having an opening passing therethrough;

a support beam means extending between said front and rear stands having bracket members, and means for suspending said shutter members from said bracket members, said means for suspending said shutter members from said bracket members comprises a longitudinal aperture means vertically disposed on one of said bracket and shutter members and a horizontally disposed pivot shaft mounted to the other of said bracket and shutter members extending into said aperture such that said shutter members are pivotable relative to said bracket members in a vertical plane parallel to said support beam means and are displaceable relative to said bracket member along a vertical path, whereby when said hanging rod means are positioned below said shutter members and are moved upwardly and downwardly between said upper and lower predetermined positions when said filter plates are in said normal open position said shutter members are displaced along said vertical path by said hanging rod means;

a light emitting device arranged on one of said front and rear stands; and a light receiving device arranged on the other of said front and rear stands;

a light emitted from said light emitting device passing through said openings of said shutter members when said shutter members are displaced along said vertical path by said hanging rod means moved to said upward predetermined position aligning said openings of said shutter members and allowing said light to be received by said light receiving device.

2. A filter press as claimed in claim 1, wherein said shutter members are each rod-shaped.

* * * * *